(12) United States Patent
Vetter et al.

(10) Patent No.: US 9,667,703 B1
(45) Date of Patent: May 30, 2017

(54) SYSTEM, METHOD AND COMPUTER PROGRAM PRODUCT FOR GENERATING REMOTE VIEWS IN A VIRTUAL MOBILE DEVICE PLATFORM

(71) Applicant: Hypori, Inc., Austin, TX (US)

(72) Inventors: Brian J. Vetter, Austin, TX (US); Patrick Turley, Austin, TX (US)

(73) Assignee: Hypori, Inc., Austin, TX (US)

( * ) Notice: Subject to any disclaimer, the term of this patent is extended or adjusted under 35 U.S.C. 154(b) by 154 days.

(21) Appl. No.: 14/161,157

(22) Filed: Jan. 22, 2014

Related U.S. Application Data

(60) Provisional application No. 61/755,205, filed on Jan. 22, 2013.

(51) Int. Cl.
| | | |
|---|---|---|
| G06F 15/16 | (2006.01) | |
| H04L 29/08 | (2006.01) | |
| G06F 9/455 | (2006.01) | |
| G06F 3/06 | (2006.01) | |

(52) U.S. Cl.
CPC .............. *H04L 67/10* (2013.01); *G06F 3/068* (2013.01); *G06F 9/455* (2013.01)

(58) Field of Classification Search
None
See application file for complete search history.

(56) References Cited

U.S. PATENT DOCUMENTS

| | | | |
|---|---|---|---|
| 6,845,238 B1 | 1/2005 | Muller | |
| 7,190,356 B2 | 3/2007 | Lin | |
| 7,400,328 B1 | 7/2008 | Ye et al. | |
| 7,768,959 B1 | 8/2010 | Chen | |
| 7,809,667 B1 | 10/2010 | Yehuda et al. | |
| 7,827,228 B2 | 11/2010 | Emberton | |
| 8,699,379 B2 | 4/2014 | Kholaif et al. | |
| 9,060,239 B1* | 6/2015 | Sinha | ..................... H04L 51/04 |
| 9,143,886 B1 | 9/2015 | Abou-El-Ella | |
| 9,179,007 B1 | 11/2015 | Yadav | |
| 9,245,241 B2 | 1/2016 | Kite | |
| 9,380,456 B1 | 6/2016 | Lee et al. | |
| 9,380,523 B1 | 6/2016 | Mijar et al. | |
| 9,380,562 B1 | 6/2016 | Vetter et al. | |
| 2003/0182383 A1 | 9/2003 | He | |
| 2005/0088992 A1 | 4/2005 | Bolin | |
| 2006/0203916 A1* | 9/2006 | Chandramouly | .... H04N 19/176 375/240.24 |

(Continued)

OTHER PUBLICATIONS

Office Action for U.S. Appl. No. 14/160,794, mailed Sep. 1, 2015, 12 pgs.

(Continued)

*Primary Examiner* — Viet Vu
*Assistant Examiner* — James Edwards
(74) *Attorney, Agent, or Firm* — Sprinkle IP Law Group

(57) ABSTRACT

Embodiments disclosed herein provide a system, method, and computer program product for generating remote views in a virtual mobile device platform. In one embodiment, events from a physical mobile device are sent to a distant virtual device. The virtual device creates views based on the received events. Graphical attributes of one or more of the created views are captured and sent to the physical mobile device. Remote views are generated at the physical mobile device based on the attributes received from the virtual device.

20 Claims, 11 Drawing Sheets

(56) References Cited

U.S. PATENT DOCUMENTS

| | | | |
|---|---|---|---|
| 2006/0288306 A1 | 12/2006 | Mahajan et al. | |
| 2007/0086382 A1 | 4/2007 | Narayanan | |
| 2007/0117561 A1 | 5/2007 | Shu | |
| 2008/0225010 A1 | 9/2008 | Wang | |
| 2009/0023426 A1 | 1/2009 | Shatzkamer | |
| 2009/0077475 A1* | 3/2009 | Koster | A63F 13/12 715/757 |
| 2009/0131080 A1 | 5/2009 | Nadler | |
| 2009/0170472 A1 | 7/2009 | Chapin | |
| 2009/0207140 A1 | 8/2009 | Hansson | |
| 2009/0264094 A1 | 10/2009 | Smith | |
| 2009/0296689 A1 | 12/2009 | Bakker et al. | |
| 2010/0069035 A1 | 3/2010 | Johnson | |
| 2010/0100725 A1 | 4/2010 | Ozzie | |
| 2010/0103837 A1 | 4/2010 | Jungck | |
| 2010/0115020 A1 | 5/2010 | Hochmuth et al. | |
| 2010/0167714 A1 | 7/2010 | Howarter | |
| 2010/0173605 A1 | 7/2010 | Moraes | |
| 2010/0189887 A1 | 7/2010 | Nielsen | |
| 2010/0238837 A1 | 9/2010 | Zheng | |
| 2010/0306249 A1 | 12/2010 | Hill | |
| 2010/0306771 A1* | 12/2010 | Kamay | G06F 9/45558 718/1 |
| 2011/0102299 A1 | 5/2011 | Hochmuth et al. | |
| 2011/0130951 A1 | 6/2011 | Lee | |
| 2011/0176528 A1 | 7/2011 | Lu | |
| 2011/0210972 A1 | 9/2011 | Tsirkin et al. | |
| 2011/0213828 A1 | 9/2011 | Tsirkin et al. | |
| 2011/0223918 A1 | 9/2011 | Dahlen | |
| 2011/0270600 A1 | 11/2011 | Bose | |
| 2011/0271200 A1 | 11/2011 | Kikkawa et al. | |
| 2012/0030022 A1 | 2/2012 | Ajima et al. | |
| 2012/0064908 A1* | 3/2012 | Fox | H04W 28/10 455/452.2 |
| 2012/0066304 A1 | 3/2012 | Marmon et al. | |
| 2012/0093145 A1 | 4/2012 | Anchan et al. | |
| 2012/0130042 A1 | 5/2012 | Brunelle et al. | |
| 2012/0182970 A1 | 7/2012 | Ding | |
| 2012/0191657 A1* | 7/2012 | Weinstein | H04L 67/1095 707/654 |
| 2012/0296963 A1 | 11/2012 | Lu | |
| 2012/0310894 A1* | 12/2012 | Freedman | G06F 11/1402 707/674 |
| 2012/0323690 A1 | 12/2012 | Michael | |
| 2013/0024778 A1 | 1/2013 | Reeves et al. | |
| 2013/0031482 A1 | 1/2013 | Saul | |
| 2013/0078994 A1 | 3/2013 | Jouin | |
| 2013/0083960 A1* | 4/2013 | Kostrzewski | H05K 7/1427 382/103 |
| 2013/0086202 A1 | 4/2013 | Connelly | |
| 2013/0173556 A1* | 7/2013 | Grigg | H04L 67/04 707/667 |
| 2013/0188608 A1 | 7/2013 | Balachandran | |
| 2013/0265450 A1 | 10/2013 | Barnes, Jr. | |
| 2013/0275766 A1 | 10/2013 | Plainecassagne et al. | |
| 2013/0283038 A1* | 10/2013 | Kulkarni | H04L 63/065 713/153 |
| 2013/0326072 A1 | 12/2013 | Smyth | |
| 2013/0339185 A1 | 12/2013 | Johnson | |
| 2013/0339498 A1 | 12/2013 | Johnson | |
| 2014/0059160 A1 | 2/2014 | Chernoff | |
| 2014/0071895 A1 | 3/2014 | Bane et al. | |
| 2014/0108084 A1 | 4/2014 | Bargetzi | |
| 2014/0108940 A1 | 4/2014 | Diercks | |
| 2014/0111528 A1 | 4/2014 | Lifshitz et al. | |
| 2014/0358670 A1 | 12/2014 | Lefevre | |
| 2015/0050915 A1 | 2/2015 | Formo | |
| 2015/0082456 A1 | 3/2015 | Eren et al. | |
| 2015/0089395 A1 | 3/2015 | Beel et al. | |
| 2015/0091947 A1 | 4/2015 | Rakow et al. | |
| 2015/0222604 A1* | 8/2015 | Ylonen | H04L 63/062 713/171 |
| 2016/0295394 A1 | 10/2016 | Mijar et al. | |
| 2016/0295551 A1 | 10/2016 | Vetter et al. | |

OTHER PUBLICATIONS

Office Action for U.S. Appl. No. 14/062,343, mailed May 26, 2015, 16 pgs.
Office Action for U.S. Appl. No. 14/161,083, mailed Jul. 8, 2016, 31 pgs.
Notice of Allowance for U.S. Appl. No. 14/161,069, mailed May 6, 2016, 5 pgs.
Notice of Allowance for U.S. Appl. No. 14/160,904, mailed May 18, 2016, 6 pgs.
Notice of Allowance for U.S. Appl. No. 15/181,783, mailed Dec. 2, 2016, 5 pgs.
Notice of Allowance for U.S. Appl. No. 14/161,083, mailed Dec. 5, 2016, 6 pgs.
Office Action for U.S. Appl. No. 14/160,794, mailed Aug. 22, 2016, 6 pgs.
Office Action for U.S. Appl. No. 15/181,783, mailed Aug. 22, 2016, 10 pgs.
Office Action for U.S. Appl. No. 14/160,946, mailed Aug. 31, 2016, 28 pgs.
Office Action for U.S. Appl. No. 14/161,083, mailed Feb. 3, 2016, 27 pgs.
Notice of Allowance for U.S. Appl. No. 14/160,904, mailed Mar. 8, 2016, 6 pgs.
Office Action for U.S. Appl. No. 14/160,794, mailed Mar. 9, 2016, 11 pgs.
Office Action for U.S. Appl. No. 14/160,946, mailed Mar. 9, 2016, 20 pgs.
Notice of Allowance for U.S. Appl. No. 14/161,069, mailed Mar. 14, 2016, 7 pgs.
Notice of Allowance for U.S. Appl. No. 14/160,877, mailed Apr. 7, 2016, 9 pgs.
Office Action for U.S. Appl. No. 14/160,946, mailed Jan. 11, 2017, 30 pgs.
Office Action for U.S. Appl. No. 15/181,570, mailed Feb. 1, 2017, 6 pgs.
Notice of Allowance for U.S. Appl. No. 14/160,794, mailed Feb. 17, 2017, 4 pgs.

* cited by examiner

SYSTEM, METHOD AND COMPUTER PROGRAM PRODUCT FOR GENERATING REMOTE VIEWS IN A VIRTUAL MOBILE DEVICE PLATFORM

CROSS-REFERENCE TO RELATED APPLICATIONS

This application is a conversion of and claims a benefit of priority from U.S. Provisional Application No. 61/755,205, filed Jan. 22, 2013, entitled "VIRTUAL MOBILE DEVICE PLATFORM." This application relates to U.S. patent application Ser. No. 14/160,794, filed Jan. 22, 2014, entitled "SYSTEM, METHOD AND COMPUTER PROGRAM PRODUCT FOR CAPTURING TOUCH EVENTS FOR A VIRTUAL MOBILE DEVICE PLATFORM"; Ser. No. 14/160,877, filed Jan. 22, 2014, entitled "SYSTEM, METHOD AND COMPUTER PROGRAM PRODUCT FOR PROVIDING NOTIFICATIONS FROM A VIRTUAL DEVICE TO A DISCONNECTED PHYSICAL DEVICE"; Ser. No. 14/160,904, filed Jan. 22, 2014, entitled "SYSTEM, METHOD AND COMPUTER PROGRAM PRODUCT FOR CONNECTING ROAMING MOBILE DEVICES TO A VIRTUAL DEVICE PLATFORM"; Ser. No. 14/160,946, filed Jan. 22, 2014, entitled "SYSTEM, METHOD AND COMPUTER PROGRAM PRODUCT PROVIDING BYPASS MECHANISMS FOR A VIRTUAL MOBILE DEVICE PLATFORM"; Ser. No. 14/161,069, filed Jan. 22, 2014, entitled "SYSTEM, METHOD AND COMPUTER PROGRAM PRODUCT FOR DYNAMICALLY SWITCHING OPERATING SYSTEMS IN A VIRTUAL MOBILE DEVICE PLATFORM"; and Ser. No. 14/161,083, filed Jan. 22, 2014, entitled "SYSTEM, METHOD AND COMPUTER PROGRAM PRODUCT FOR USER PERFORMANCE AND DEVICE RESOLUTION SETTINGS." All applications listed in this paragraph are incorporated by reference as if set forth herein in their entireties.

TECHNICAL FIELD

This disclosure relates generally to a virtual mobile device platform for mobile devices. More particularly, embodiments disclosed herein relate to a system, method, and computer program product for generating remote views in a virtual mobile device platform.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE DISCLOSURE

Embodiments disclosed herein provide a system, method, and computer program product for generating remote views in a virtual mobile device platform. In some embodiments, events from a physical mobile device are sent to a distant virtual device. The distant virtual device creates one or more views based on the received events. Graphical attributes of one or more of the created views are captured and sent to the physical mobile device. Remote views are constructed and displayed on the physical mobile device based on the attributes received from the virtual device. For views where graphical attributes are not captured, compressed video of the respective views can be sent to the physical mobile device.

Embodiments disclosed herein can provide many advantages. For example, in some embodiments, generating remote views using graphical attributes improves the responsiveness of remote applications, as well as reduces video bandwidth consumption.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
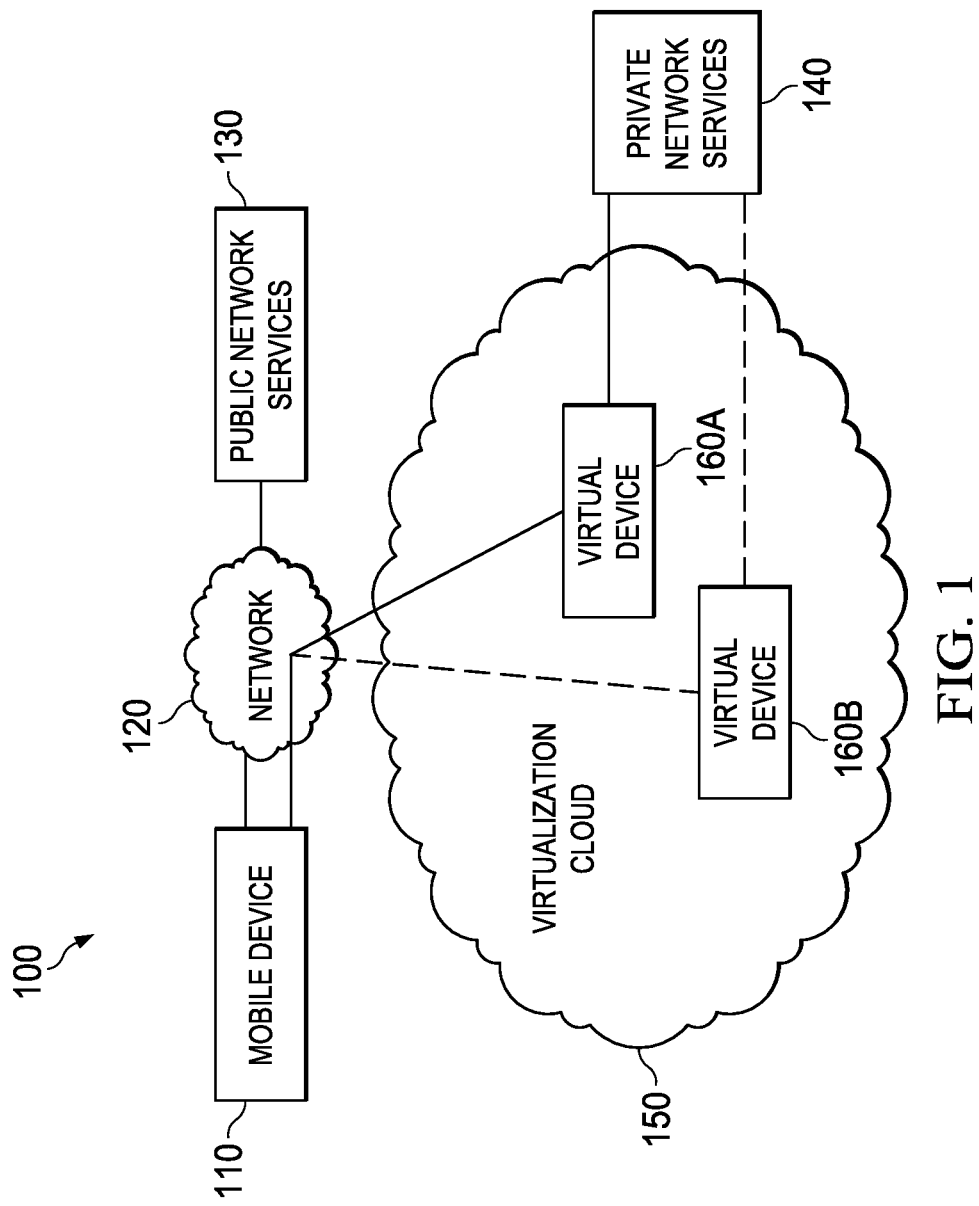
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
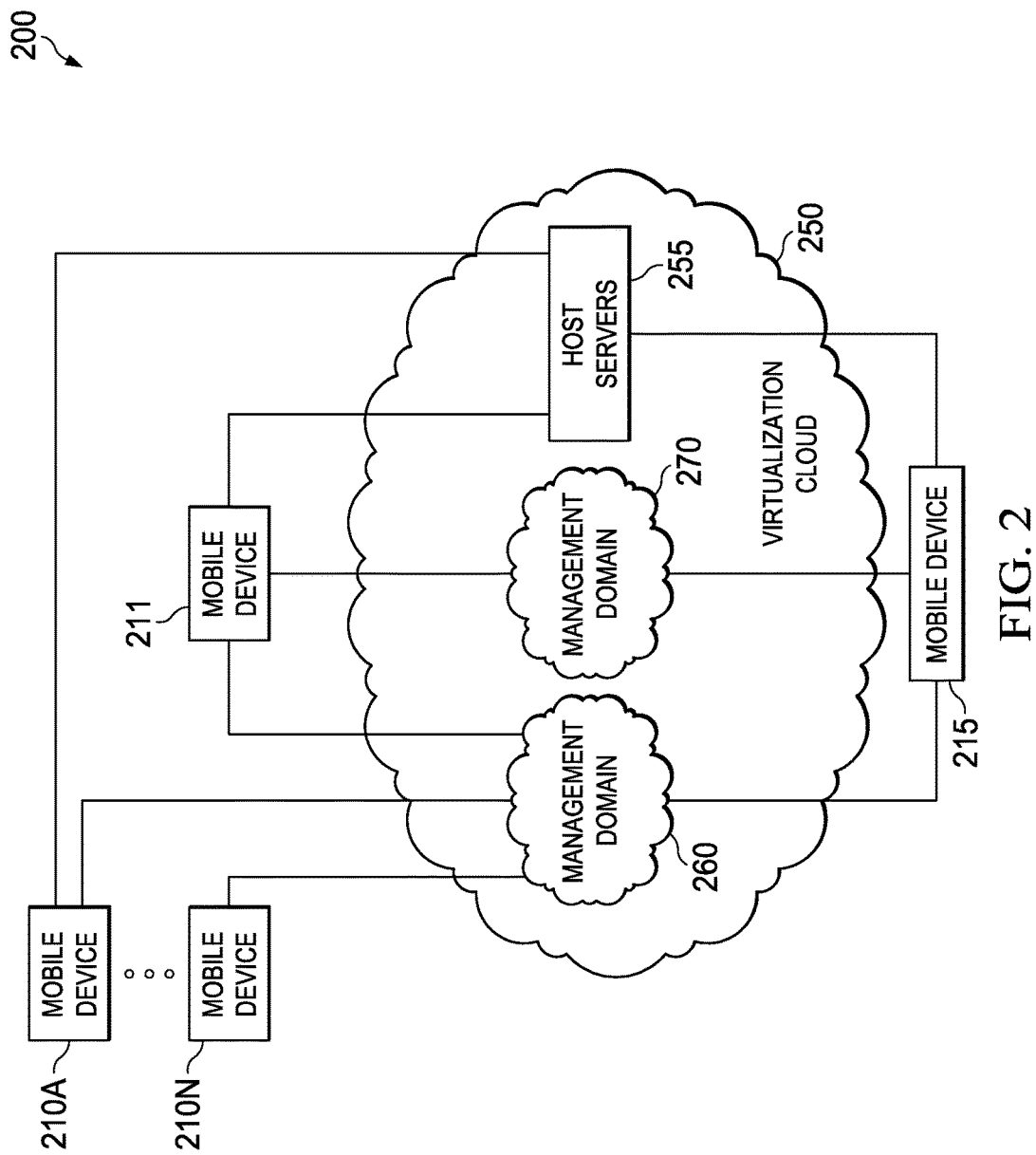
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
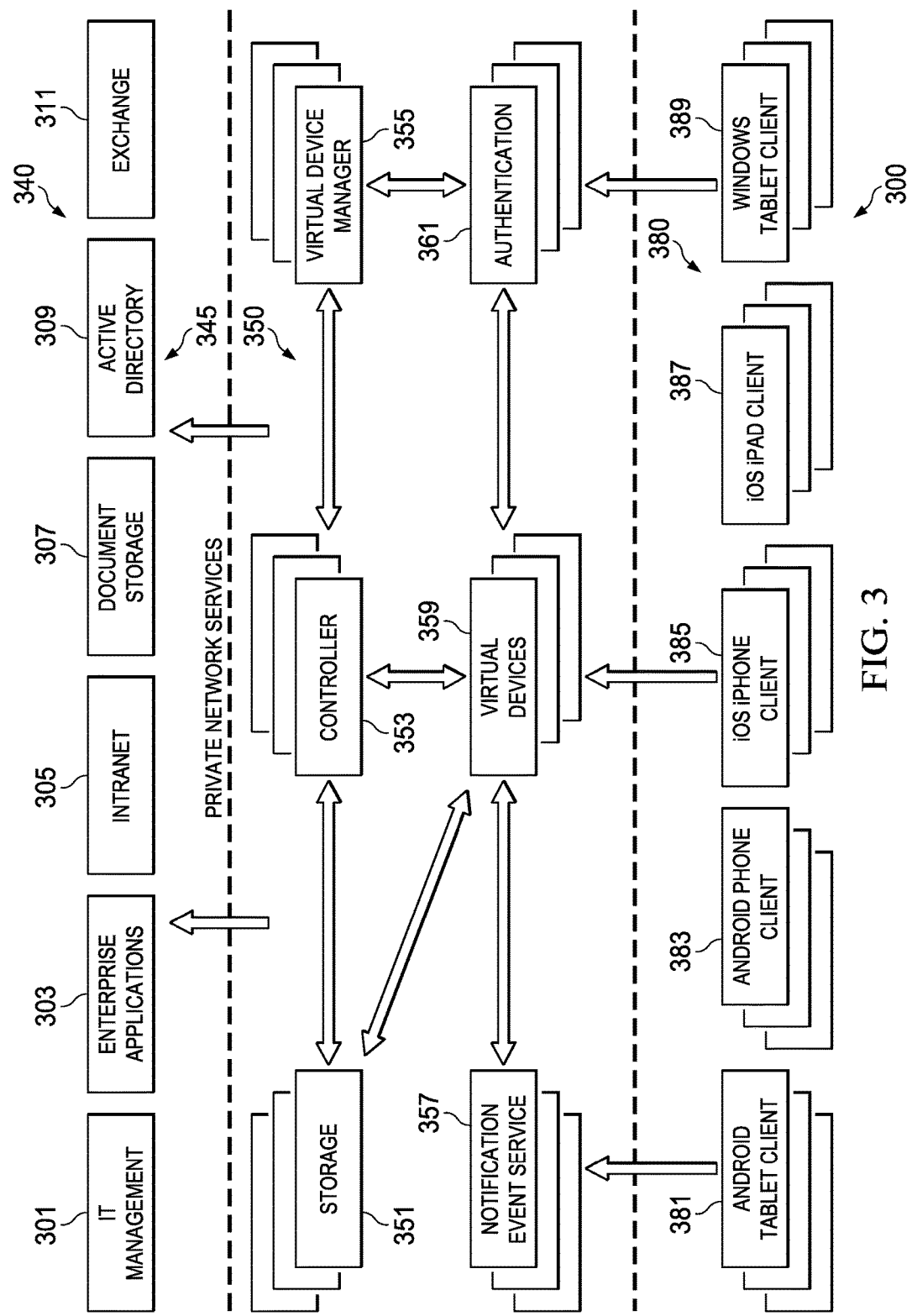
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
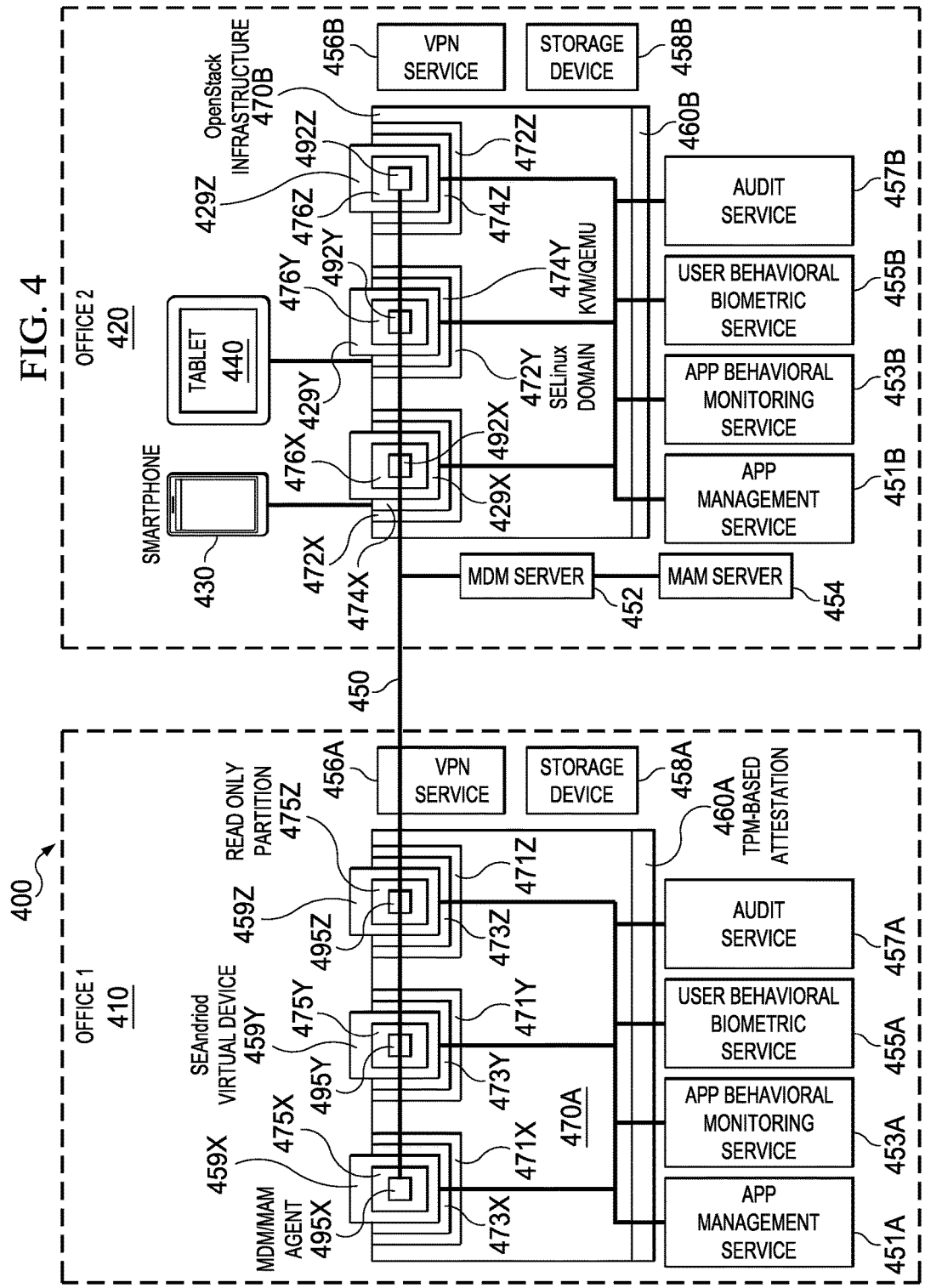
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
  Scheduling specific times for upgrades to occur.
  Roll back to a previous device template if an error occurs.
  Partial, incremental upgrade processes across a user population.
  Detection of whether a user is active on a virtual device before enacting the upgrade.

Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
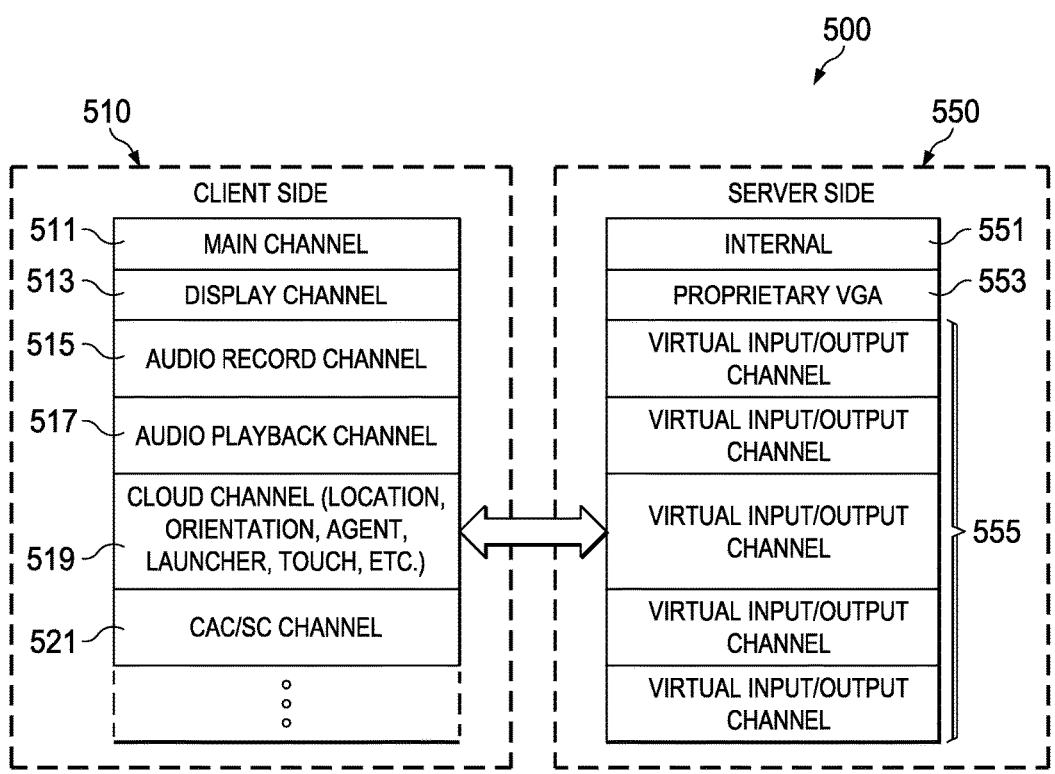
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
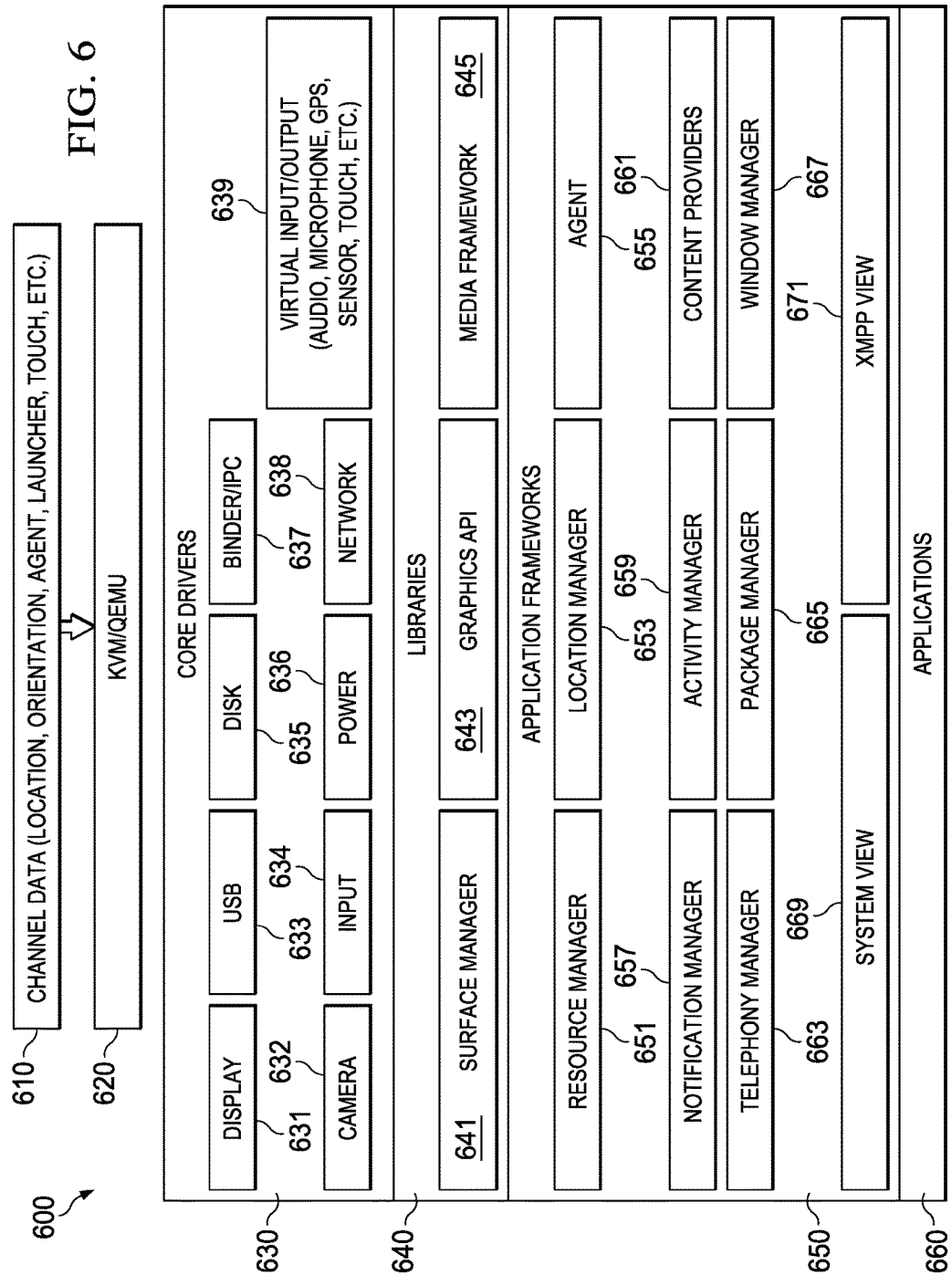
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

As described above, a physical mobile device is separated from applications, which are run on protected hardware and software in a data center where they can be managed, monitored, repaired, and deployed under the care of information technology (IT) experts and administrators. As such, visual displays generated by applications run on remote hardware are displayed on the physical mobile device. One challenge in such a system is providing the remote views on the physical device with as little delay as possible. Described below are techniques for providing visual displays in an efficient manner.

To better understand the techniques described below, it is helpful to understand how graphics are displayed on a typical mobile device. For the purposes of this description, an exemplary Android environment will be used to describe how graphics can be displayed on a mobile device. Other examples and environments are also possible, as one skilled in the art will understand. Generally, Android applications convert events into visual displays. The Android applications consume events that describe changes in the environment (e.g., GPS) and user actions (e.g., screen touches). After processing these events, apps construct visual displays that (presumably) reflect the meaning of the events.

In some embodiments, a system collects events from a local, physical mobile device, transmits information relating to the events to a distant virtual Android device, and returns the resulting visual display to the local physical device. Such a system presents challenges with issues such as network latency and bandwidth consumption. Described below are techniques that overcome the challenges presented by issues such as network latency and bandwidth consumption. The techniques described improve the responsiveness of remote applications, as well as reduce video bandwidth consumption.

Figure 7A:
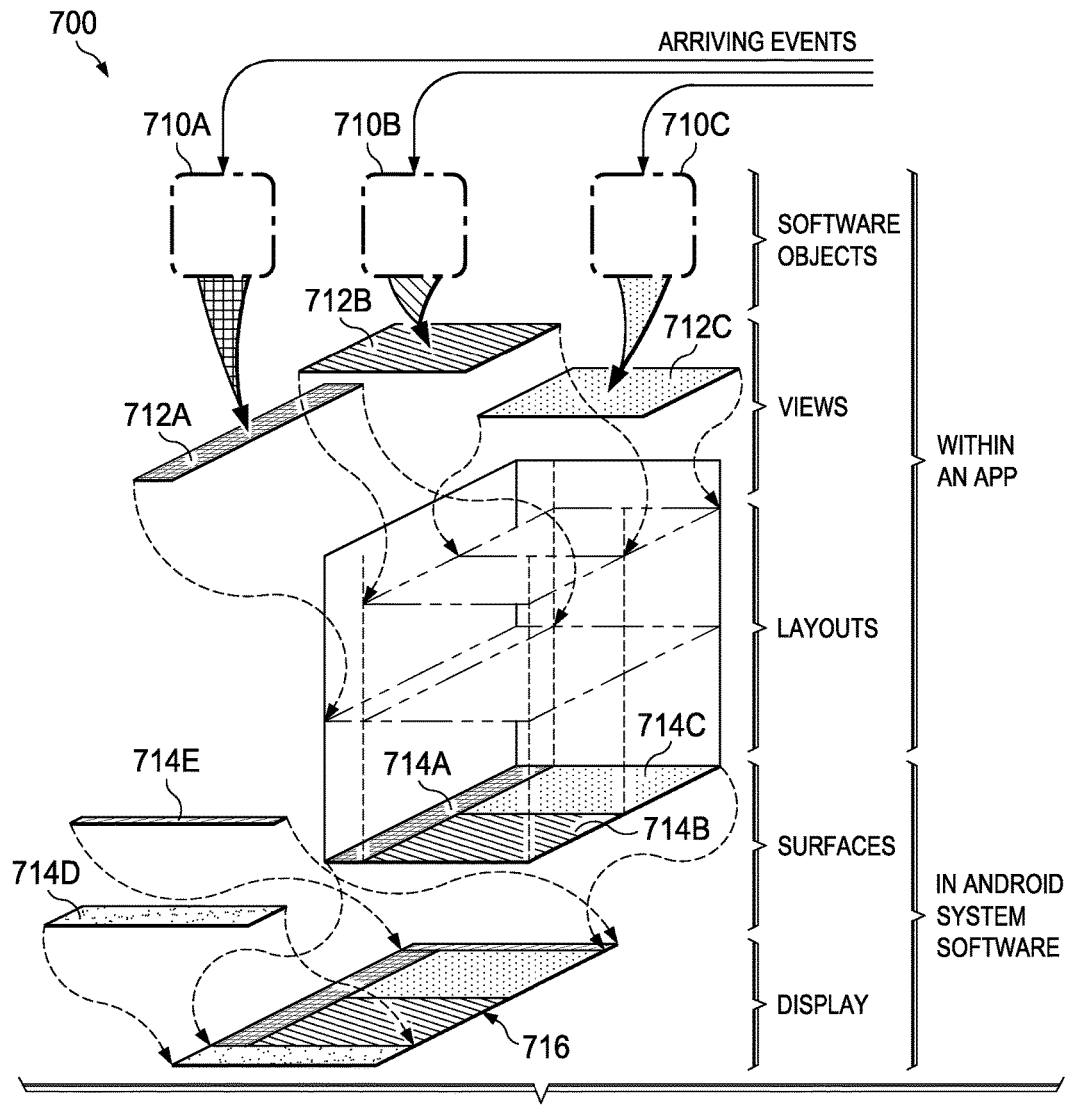
FIG. 7A depicts a diagrammatic representation of an example of an Android graphics stack.

FIG. 7A is a diagram illustrating the structure of an exemplary Android graphics stack in a typical Android application. Generally, the Android system constructs a display through two composition operations, described below. FIG. 7A illustrates functions that happen within an Android application and within the Android system software, as illustrated by the brackets at the far right of FIG. 7A.

Each view in an application's display represents a different way of visualizing the application's internal state. It follows, then, that each view requires unique logic to draw and maintain it.

When an application starts, one task is to register with the Android system to receive events. As discussed above, events describe changes to the environment or the user. The events may cause the application to change one or more of its views to reflect the arrival of the event. That is, when a software object receives an event, it may change the way it draws into its view.

FIG. 7A shows events arriving at a plurality of software objects (710A, 710B, 710C) of an application. The events may come from any source, such as sensors, a touch screen, etc. Each software object processes the received events according to the needs of the application. A given application's visual content is typically divided into several sub-areas called "views." The software objects (710A, 710B, 710C) in FIG. 7A draw the views (712A, 712B, 712C), respectively. Each visible application in the Android system has at least one "surface" on which it may draw. With assistance from the Android system, the application composes the views (712A, 712B, 712C) within the application's surface(s), typically (though not necessarily) using objects called "layouts." FIG. 7A shows the resulting surfaces (714A, 714B, 714C). The Android system software also has surfaces it manages for itself, for example, a "navigation bar" surface 714D and a "status bar" surface 714E.

Figure 7B:
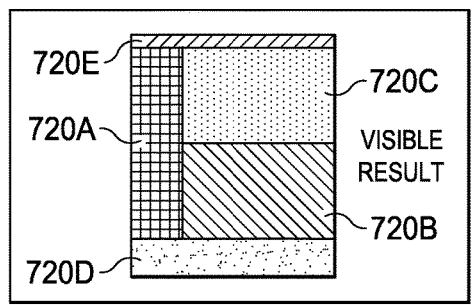
FIG. 7B depicts a diagrammatic representation of a viewable display.

At the bottom of the Android graphics stack illustrated in FIG. 7A, the Android system composes these surfaces into the display 716 the user sees. FIG. 7B shows the visible result of the display, which is what is viewable by a user. The visible result of the display includes components 720A, 720B, 720C, 720D, and 720E originating from the surfaces 714A, 714B, 714C, 714D, and 714E, respectively. When the user switches to a different application, the Android system will compose that application's visual content into the display.

Figure 8:
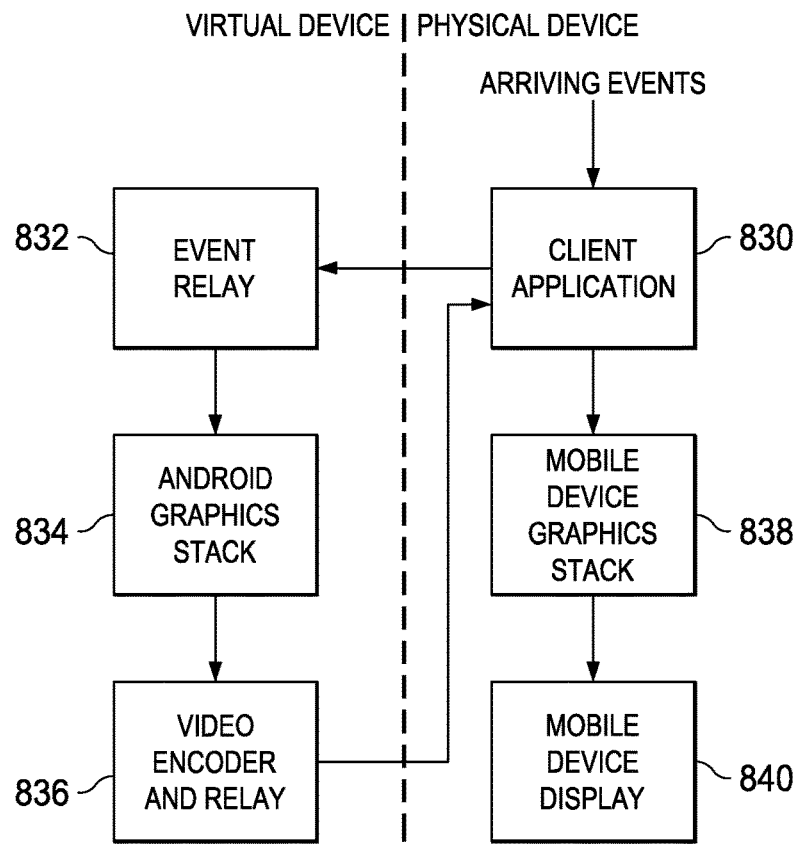
FIG. 8 depicts a diagrammatic representation of an example of a system for generating remote views according to one embodiment.

In the virtual mobile device platform described above, the visual display on the physical mobile device is remote from the virtual device and the virtual device's virtual display. As mentioned, the system collects events from the local, physical device; transmits them to a distant, virtual Android device; and returns the resulting visual display to the local, physical device. FIG. 8 is a block diagram illustrating a system for implementing a process of generating remote views.

FIG. 8 is divided by a dashed line to illustrate the separation between the virtual device and the remote physical device. As shown, events arrive at the physical device, and are provided to the client application 830. The events are relayed to the virtual device via event relay 832. For clarity, FIG. 8 (as well as FIGS. 9, 11, and 12) illustrates an event relay output feeding into the Android graphics stack. However, note that the event relay actually feeds into an application, and thence to the graphics stack. Typically, when an application is running, it incorporates parts of the graphics stack into itself. The events are then processed by the Android graphics stack 834, similar to that described above with respect to FIG. 7A. The resulting display is provided to a video encoder and relay 836. The video encoder and relay encodes and compresses the display information, and returns it back to the client application 830. At the physical device, the client application 830 decodes and decompresses the display information and provides the information to the mobile device graphic stack 838, which then provides display information to the mobile device display 840.

Figure 9:
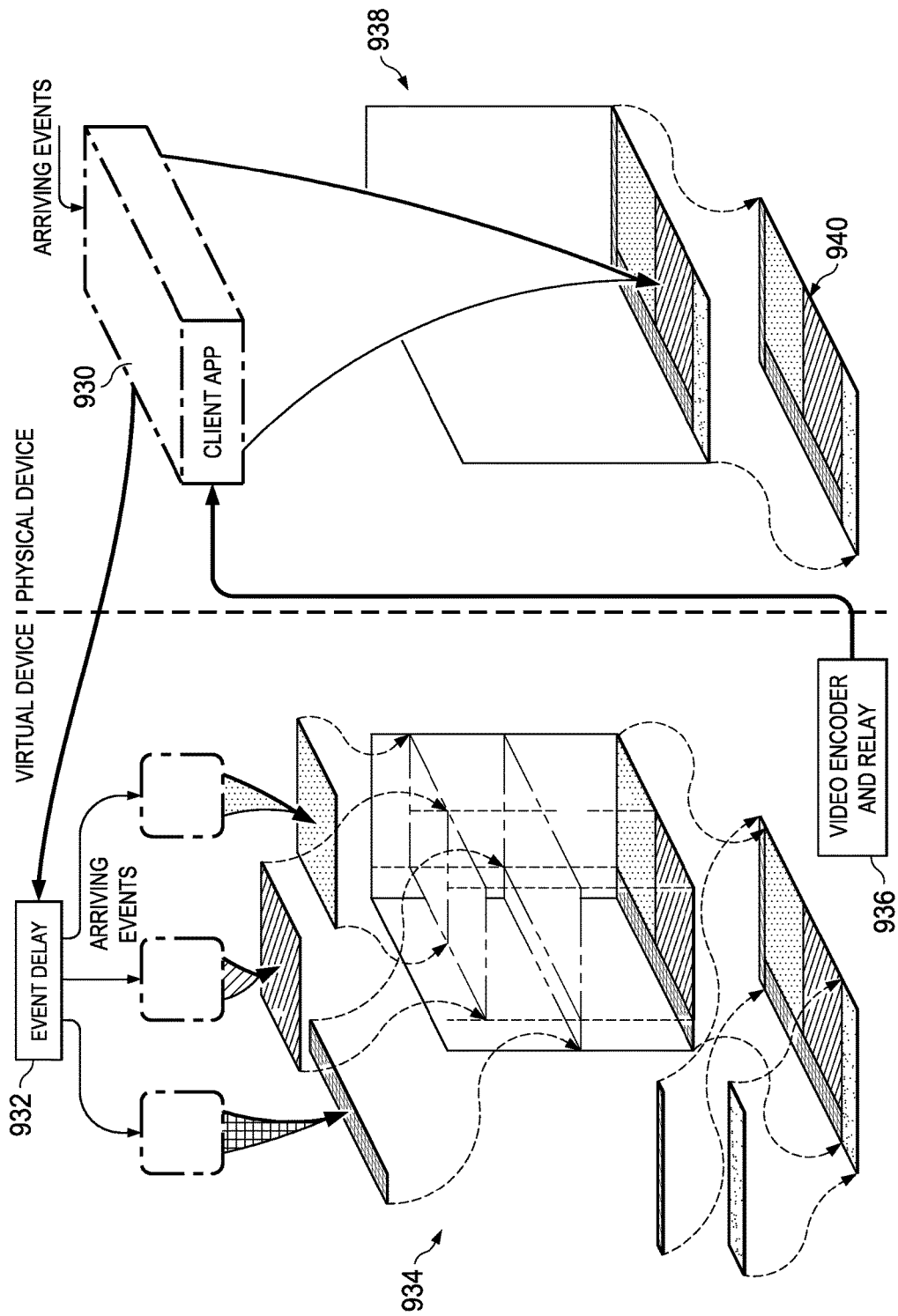
FIG. 9 depicts a diagrammatic representation of an example of a system for relaying the contents of the virtual display to a client running on the physical device according to one embodiment.

FIG. 9 is a diagram illustrating a more detailed example of the system shown in FIG. 8. As before, events arrive at the physical device, and are provided to the client application 930. The events are relayed to the virtual device via event relay 932. The events are then processed by the Android graphics stack 934. The various components of the graphics stack 934 are similar to the components illustrated in FIG. 7A. The resulting display is provided to a video encoder and relay 936. The video encoder and relay 936 encodes and compresses the display information, and sends it to the client application 930. At the physical device, the client application 930 decodes and decompresses the display information and provides the information to the mobile device graphic stack 938, which generates display 940, which is displayed on the display of the physical device.

The system illustrated in FIGS. 8 and 9 has various advantages and disadvantages. First, it always works—in the sense that the physical display will always correctly reflect the content of the remote, virtual display. One challenge with the system shown in FIGS. 8 and 9 is that the system is bandwidth intensive. Even with the benefit of data compression, transmitting the entire display to the client consumes a lot of bandwidth. Another challenge relates to network latency. On a physical device in a user's hand, there is essentially zero latency between when the user generates events and when a locally installed application receives them. Similarly, there's essentially zero latency between when a locally installed application produces new visual content and the display offers it to the user. The mechanism illustrated in FIGS. 8-9 introduces substantial latency at both points. It is therefore desirable to use techniques to address the bandwidth and latency issues.

One approach to address concerns relating to network latency and bandwidth requirements is to try to maintain views at the physical device that mirror views at the remote virtual device, without necessarily sending pure video data. For example, if it is known at the virtual device how views are generated, or what is shown graphically, it may be possible to maintain a mirror view on the physical device while sending only a minimum amount of information. In one example, when attributes of a created view are known, such as uniform colors, vector graphics, text, etc., rather than sending video data to the physical device for that view, the attributes are sent. At the physical device, the received attributes are used to create a view that is substantially the same as the view at the virtual device.

Following is a specific example of how know attributes of a view can be used to reduce the required bandwidth between virtual and physical devices. For the purposes of this description, the term "semantic compression" is used to refer to the process of using known attributes of a view to communicate enough information that the view can be recreated without receiving an image or video of the view itself.

Figure 10:
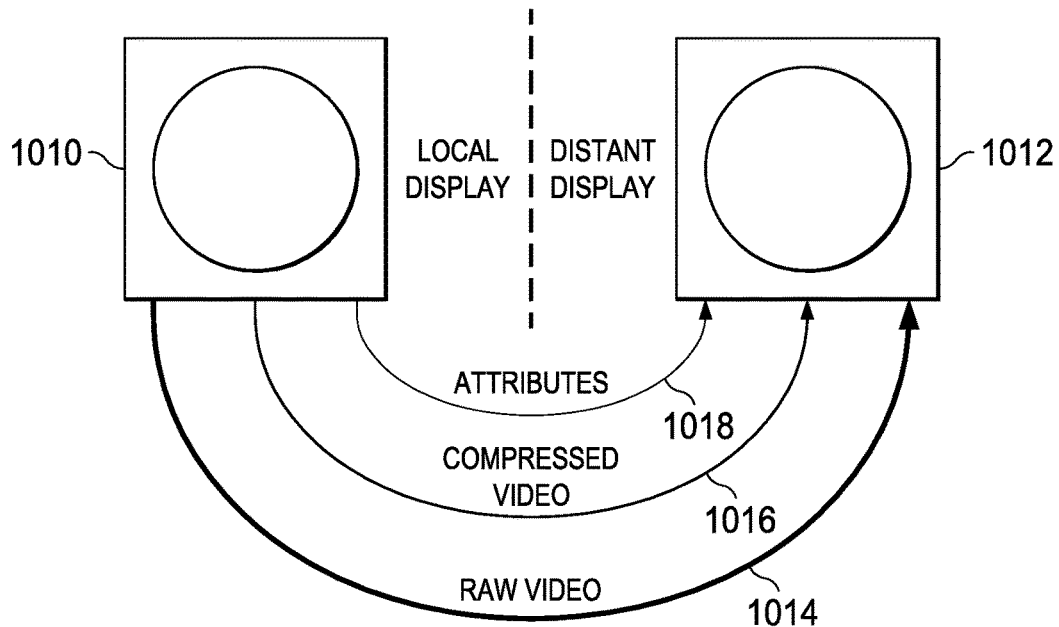
FIG. 10 depicts a diagrammatic representation of examples of mechanisms for synchronizing local and distant displays.

Imagine two identical displays, one local and one distant, such as with the physical and virtual devices described above. Further imagine that one may want the distant display to always show the same contents as the local display, and, for simplicity, the only thing they will ever show are circles of varying radii, centered on the display. FIG. 10 is a diagram illustrating three mechanisms for synchronizing a local display 1010 and a distant display 1012.

A first mechanism involves sending raw video to the distant display (illustrated by line 1014). If one transmits raw video to the distant display, one is sending every single pixel over a communication link. This consumes a tremendous amount of bandwidth and is very sensitive to latency.

A second mechanism involves sending compressed video to the distant display (illustrated by line 1016). If one transmits compressed video to the distant display, one can dramatically lower the bandwidth required to synchronize the displays, as compared to sending raw video data. A good compression algorithm will essentially transmit only the pixels that were part of the circle, and would be much less sensitive to latency.

A third mechanism involves sending attributes of what is displayed on the local display to the distant display (illustrated by line 1018). Since one knows (in this example) that the only thing ever to appear on the display is a centered circle, one could just send the single attribute of the circle, its radius. This requires miniscule bandwidth, it would be very insensitive to latency, and one would only need to transmit the radius of the circle when it changed. Of course, more complex examples are possible using the same mechanism, as one skilled in the art would understand.

The general principle in the third exemplary mechanism is that, if the form of the visual content beyond just the raw pixel data is understood, the attributes of that form can be captured and transmitted instead of the pixel data. The result can be far more compact than any video encoding. Thus, the system is effectively compressing the visual content by understanding its meaning (i.e., semantic compression).

In the examples described below, a system is described that climbs up the Android graphics stack, capturing the attributes of visual content at higher levels, enabling the transmission of less data, but more meaningful data.

Figure 11:
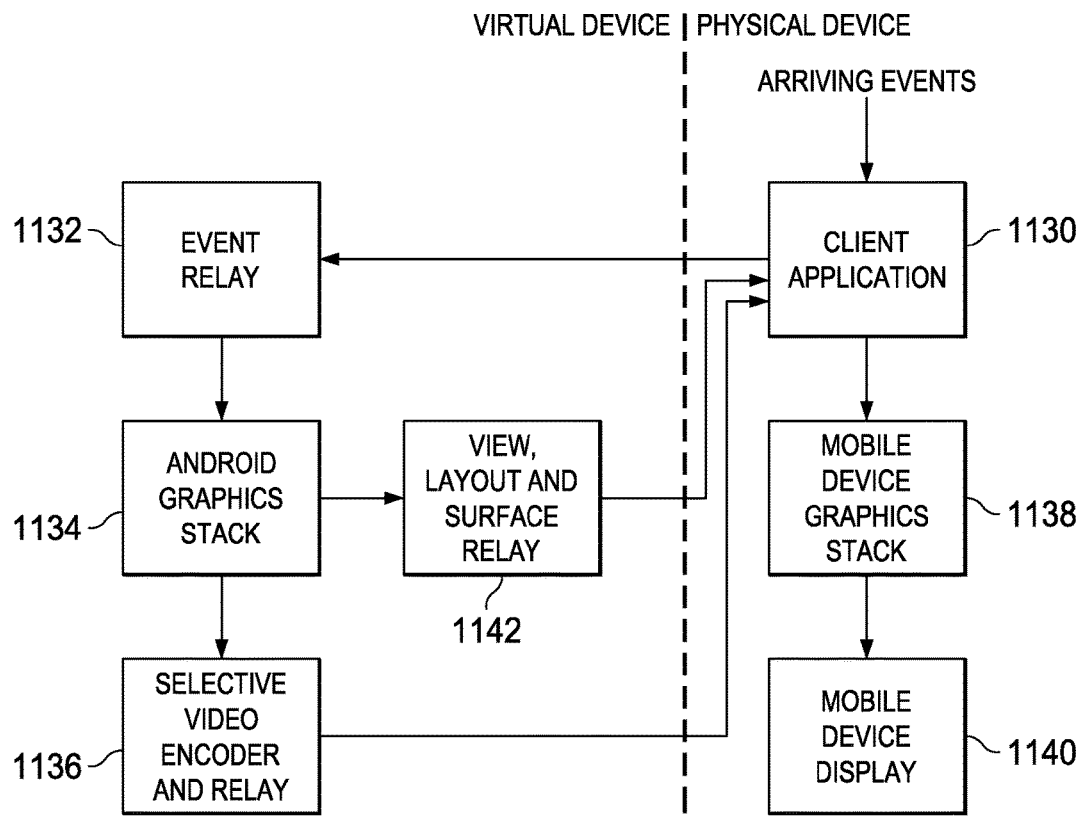
FIG. 11 depicts a diagrammatic representation of an example of a system for both generating remote views using graphical attributes and/or relaying the contents of the virtual display according to one embodiment.

FIG. 11 is a block diagram illustrating a system for implementing a semantic compression process for generating remote views, such as the third mechanism described above. Like FIG. 8 above, FIG. 11 is divided by a dashed line to illustrate the separation between the virtual device and the remote physical device. As before, events arrive at the physical device, and are provided to the client application 1130. The events are relayed to the virtual device via event relay 1132. The events are then processed by the Android graphics stack 1134, similar to that described above with respect to FIG. 7A. The resulting display is provided to a video encoder and relay 1136. Information from the graphics stack (described below) is provided to the view, layout and surface relay 1142. This information includes attribute information of any views where attributes have been captured. The captured attribute information can include any desired attributes such as: vector graphic information (e.g., lines, shapes, etc.), colors (e.g., a background color, etc.), textual information (e.g., text, font, size, etc.), predefined symbols or icons, etc. The view, layout and surface relay 1142 returns the attribute data to the client application 1130 for any views for which attribute data is captured. The selective video encoder and relay 1136 encodes and compresses any display information for views that cannot be described by their attributes, and sends it to the client application 1130. In one embodiment, the selective encoder and relay 1136 is given a list of views (i.e., rectangles as defined by the views and layouts) and instructions to encode only certain views (where attributes are not available). At the physical device, the client application 1130 decodes and decompresses the display information and provides that information, along with any view attribute information, to the mobile device graphic stack 1138, which then provides display information to the mobile device display 1140.

Figure 12:
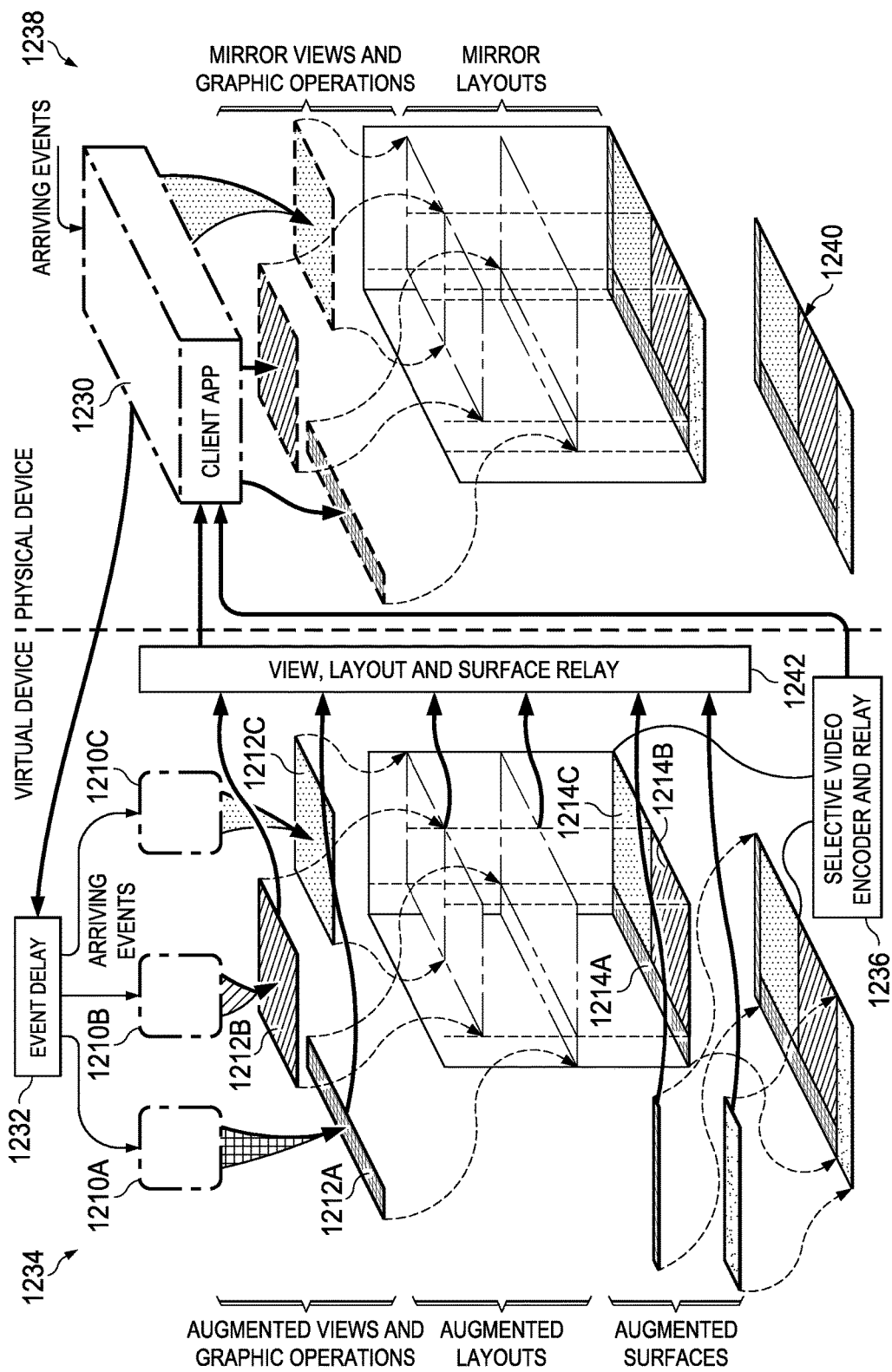
FIG. 12 depicts a diagrammatic representation of an example of a system for generating remote views using graphical attributes according to one embodiment.

FIG. 12 is a diagram illustrating a more detailed example of the system shown in FIG. 11. FIG. 12 illustrates how the Android graphics stack can be tapped at higher levels, to capture semantically more powerful information, and relay it to the client application on the physical device. Generally, one or more of the Android views, layouts, and graphic operations are augmented, so their attributes can be captured. The client application produces "mirror" views, layouts, and graphic operations on the physical device that mimic the behavior of the original views, layouts, and graphic operations on the virtual device. One example of a mirrored view is an inbox listing in an email application. The mirrored view holding the list of images can capture a local touch gesture and initiate a scroll of the individual message views in the local client.

Referring again to FIG. 12, events arrive at the physical device, and are provided to the client application 1230. The events are relayed to the virtual device via event relay 1232. The events are then processed by the Android graphics stack 1234. As with the example shown in FIG. 7A, the events arrive at a plurality of software objects (1210A, 1210B, 1210C) of an application. The software objects (1210A, 1210B, 1210C) then draw the views (1212A, 1212B, 1212C). With assistance from the Android system, the application composes the views (1212A, 1212B, 1212C) within the application's surface(s) using the layout objects. FIG. 12 shows the resulting surfaces (1214A, 1214B, 1214C). When the views (1212A, 1212B, 1212C) are created, augmented views and graphic operations are also created so their attributes can be captured. In the example of FIG. 10, where a view has just a circle, the captured attributes may include the radius of the circle. The attributes may also include the center coordinates of the circle, color of the circle, background color, etc. The layouts are also augmented and their attributes are captured. Layout attributes may include view sizes and locations (e.g., via display coordinates), so that the views can be accurately recreated at the physical device. The surfaces are also augmented and any attributes are captured.

As illustrated in FIG. 12, information regarding the augmented views and graphic operations, augmented layouts, and augmented surfaces are sent to the client application 1230 via the view, layout and surface relay 1242. At the physical device, the physical device graphic stack 1238 uses the information received by the client application 1230 to create mirror views and mirror layouts, which are used to compose surfaces and ultimately generate a display 1240. The views may include views recreated using attributes and/or views created using received video information. The semantic compression mechanism described above is far less bandwidth-intensive and less sensitive to network latency, compared to a system that does not use semantic compression (e.g., the system depicted in FIG. 9).

In some cases, it's not possible to capture and relay higher-level attributes in the graphics stack. For example, it may be difficult to capture attributes from applications that do not use Android composition mechanisms. A typical Android application will use the view and layout abstractions provided by the Android graphics system. All the Android system really cares about is that the proper visual content appears in the application's surface and, if the application can accomplish that in another way, it certainly may. A notable example is web browsers, which partition their displays into areas that resemble views, but do not necessarily manage those areas with Android's particular view objects. Since the data structures behind the display organization are not part of the Android framework, in some examples, it may be difficult to augment or mirror them.

Another example is applications that do not use Android graphic operations. A typical application may use OpenGL and other graphic facilities to produce its visual content. All the Android system really cares about is that the proper visual content appears in the application's surface and, if the application can accomplish that in another way, it certainly may do so. Thus, Android applications are free to use their own methods for producing visual content and, if they do, it may be difficult to augment or mirror them. In cases where the attributes of display objects and operations at a higher level cannot be captured, the video data can simply be encoded, compressed and transmitted for whichever parts of the screen apply.

Figure 13:
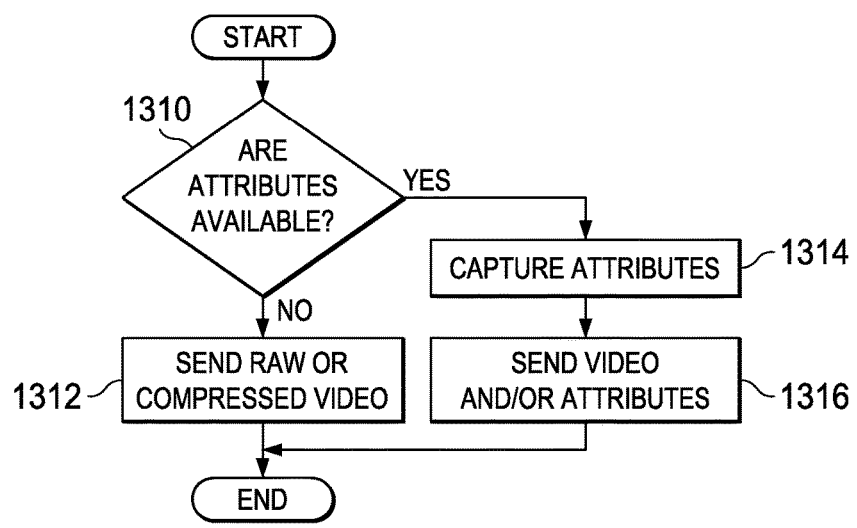
FIG. 13 depicts a flowchart of a process for generating remote views using graphical attributes according to one embodiment.

FIG. 13 is a flow chart depicting a process for generating remote views using captured graphical attributes. In some embodiments, the architecture illustrated in FIG. 12 may be used with the process. The process assumes that events have been received at a virtual device, and used by software objects to generate views and layouts. At step 13-10, the process determines if any attributes of the views and layouts are available. If not, the process proceeds to step 13-12, where raw or compressed video is sent to the physical device. If attributes are available, the attributes are captured at step 13-14. At step 13-16, the captured attributes are sent to the client application by the view, layout and surface relay. For any views that cannot be recreated using attributes (e.g., when attributes of a view are not known), compressed video is sent to the client application.

Performance of a virtual mobile device platform, as described above, can be further improved by short-circuits in the event loop. In the normal operation of a mobile device, events arrive and software processes the events and produces graphic operations. In a virtual mobile device platform, the events are sent to the virtual device, processed by the virtual device software, and the graphic operations are sent back to the physical device, defining a canonical event loop. The biggest performance gain, however, is in "short-circuits" that truncate this event loop. A taxonomy of short-circuits can be produced, classified by how far through the loop the process travels before the loop is truncated (the sooner it is truncated, the better the user experience).

A first short-circuit in the event loop relates to events that never have to leave the physical device. Some events have a visual graphical effect, but are irrelevant to the app's software. The appropriate graphic operations can be generated locally in the physical device and the events need never be sent to the virtual device. This is ideal because the user experiences zero latency.

Another short-circuit relates to events delivered to both devices. Some events have both a visual effect that can be handled locally and also have an effect on the application's software. These events should be delivered to the virtual device, but do not generate any graphic operations that must be returned to the physical device.

Another short-circuit relates to events that have no visual effect, but do affect the app's software. These events are delivered to the virtual device, but information may not need to be returned to the physical device.

Another situation relates to events that generate graphic operations. Some events have a visual effect and must be delivered to the virtual device because only the application itself can produce the correct graphic operations.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method of generating remote views in a virtual mobile device platform comprising:
   receiving, at a virtual mobile device running on the virtual mobile device platform, events from a physical mobile device, the virtual mobile device platform embodied on one or more server machines;
   creating views at the virtual mobile device in response to the received events;
   capturing one or more graphical attributes from information relating to one or more of the views created at the virtual mobile device running on the virtual mobile device platform;
   sending, by the one or more server machines, the captured one or more graphical attributes to the physical mobile device over a network, the captured one or more graphical attributes describing the one or more views created at the virtual mobile device responsive to the events collected at the physical mobile device;
   creating, at the physical mobile device, one or more mirror views based on the captured one or more graphical attributes, the one or more mirror views created at the physical mobile device mirroring the one or more of the views created at the virtual mobile device running on the virtual mobile device platform;
   at the virtual mobile device, determining which of the views has no attribute data;
   encoding and compressing any display information for any view that cannot be described by their attributes; and
   sending the encoded and compressed display information to the physical mobile device.

2. The method according to claim 1, further comprising:
   composing the one or more mirror views within one or more surfaces of an application running on the physical mobile device.

3. The method according to claim 1, wherein the views created at the virtual mobile device running on the virtual mobile device platform represent visual content of an application running on the physical mobile device.

4. The method according to claim 1, further comprising:
   at the physical mobile device, providing the events to an application running on the physical mobile device; and
   the application relaying the events to the virtual mobile device running on the virtual mobile device platform.

5. The method according to claim 1, further comprising:
   creating
      augmented views and graphic operations,
      augmented layouts, and
      augmented surfaces at the virtual mobile device;
   capturing attribute data associated with the augmented views and graphic operations, the augmented layouts, and the augmented surfaces; and
   sending the captured attribute data to the physical mobile device.

6. The method according to claim 5, further comprising:
   creating one or more mirrored layouts at the physical mobile device using the captured attribute data;
   composing one or more surfaces of an application running on the physical mobile device using the one or more mirrored views and the one or more mirrored layouts; and
   generating a display for the application running on the physical mobile device using the composed one or more surfaces.

7. The method according to claim 1, further comprising, reducing network latency by identifying, by the virtual mobile device, one or more events whose visual effect can be handled locally by the physical mobile device, and, responsive to the identifying, not sending attribute data relating to the identified one or more events to the physical mobile device.

8. A computer program product comprising at least one non-transitory computer readable medium storing instructions translatable by at least one processor to perform:
  receiving, at a virtual mobile device running on a virtual mobile device platform events from a physical mobile device, the virtual mobile device platform embodied on one or more server machines;
  creating views at the virtual mobile device in response to the received events;
  capturing one or more graphical attributes from information relating to one or more of the views created at the virtual mobile device running on the virtual mobile device platform;
  sending the captured one or more graphical attributes to the physical mobile device over a network, the captured one or more graphical attributes describing the one or more views created at the virtual mobile device responsive to the events collected at the physical mobile device, wherein the physical mobile device creates one or more mirror views based on the captured one or more graphical attributes received from the virtual mobile device, the one or more mirror views created at the physical mobile device mirroring the one or more of the views created at the virtual mobile device running on the virtual mobile device platform;
  at the virtual mobile device, determining which of the views has no attribute data;
  encoding and compressing any display information for any view that cannot be described by their attributes; and
  sending the encoded and compressed display information to the physical mobile device.

9. The computer program product of claim 8, wherein the physical mobile device composes the one or more mirror views within one or more surfaces of an application running on the physical mobile device.

10. The computer program product of claim 8, wherein the views created at the virtual mobile device running on the virtual mobile device platform represent visual content of an application running on the physical mobile device.

11. The computer program product of claim 8, wherein the events are provided to an application running on the physical mobile device and wherein the application relays the events to the virtual mobile device running on the virtual mobile device platform.

12. The computer program product of claim 8, wherein the at least one non-transitory computer readable medium stores further instructions translatable by the at least one processor to perform:
  creating
    augmented views and graphic operations,
    augmented layouts, and augmented surfaces at the virtual mobile device; capturing attribute data associated with the augmented views and graphic operations, the augmented layouts, and the augmented surfaces; and
    sending the captured attribute data to the physical mobile device.

13. The computer program product of claim 12, wherein one or more mirrored layouts are created at the physical mobile device using the captured attribute data, wherein one or more surfaces of an application running on the physical mobile device are composed using the one or more mirrored views and the one or more mirrored layouts, and wherein a display for the application running on the physical mobile device is generated using the composed one or more surfaces.

14. The computer program product of claim 8, wherein the virtual mobile device running on the virtual mobile device platform identifies one or more events whose visual effect can be handled locally by the physical mobile device, and, responsive to the identifying, does not send attribute data relating to the identified one or more events to the physical mobile device.

15. A system, comprising:
  at least one processor; and
  at least one non-transitory computer readable medium storing instructions translatable by the at least one processor to perform:
    receiving, at a virtual mobile device running on a virtual mobile device platform, events from a physical mobile device;
    creating views at the virtual mobile device in response to the received events;
    capturing one or more graphical attributes from information relating to one or more of the views created at the virtual mobile device running on the virtual mobile device platform;
    sending the captured one or more graphical attributes to the physical mobile device, the captured one or more graphical attributes describing the one or more views created at the virtual mobile device responsive to the events collected at the physical mobile device, wherein the physical mobile device creates one or more mirror views based on the captured one or more graphical attributes received from the virtual mobile device, the one or more mirror views created at the physical mobile device mirroring the one or more of the views created at the virtual mobile device running on the virtual mobile device platform;
    at the virtual mobile device, determining which of the views has no attribute data;
    encoding and compressing any display information for any view that cannot be described by their attributes; and
    sending the encoded and compressed display information to the physical mobile device.

16. The system of claim 15, wherein the physical mobile device composes the one or more mirror views within one or more surfaces of an application running on the physical mobile device.

17. The system of claim 15, wherein the views created at the virtual mobile device running on the virtual mobile device platform represent visual content of an application running on the physical mobile device.

18. The system of claim 15, wherein the at least one non-transitory computer readable medium stores further instructions translatable by the at least one processor to perform:
  creating
    augmented views and graphic operations,
    augmented layouts, and
    augmented surfaces at the virtual mobile device;
  capturing attribute data associated with the augmented views and graphic operations, the augmented layouts, and the augmented surfaces; and
  sending the captured attribute data to the physical mobile device.

19. The system of claim 18, wherein one or more mirrored layouts are created at the physical mobile device using the captured attribute data, wherein one or more surfaces of an application running on the physical mobile device are composed using the one or more mirrored views and the one or more mirrored layouts, and wherein a display for the application running on the physical mobile device is generated using the composed one or more surfaces.

20. The system of claim 15, wherein the at least one nontransitory computer readable medium stores further instructions translatable by the at least one processor to perform:

identifying one or more events whose visual effect can be handled locally by the physical mobile device; and responsive to the identifying, not sending attribute data relating to the identified one or more events to the physical mobile device.

\* \* \* \* \*